(12) United States Patent
Theisen (10) Patent No.: US 7,874,543 B2
(45) Date of Patent: Jan. 25, 2011

(54) NON-SLIP OVERLASH JIG

(76) Inventor: Kevin R. Theisen, 935 Pirates Ct., Edgewood, MD (US) 21040

( * ) Notice: Subject to any disclaimer, the term of this patent is extended or adjusted under 35 U.S.C. 154(b) by 397 days.

(21) Appl. No.: 12/185,581

(22) Filed: Aug. 4, 2008

(65) Prior Publication Data

US 2009/0065750 A1 Mar. 12, 2009

Related U.S. Application Data

(60) Provisional application No. 60/953,646, filed on Aug. 2, 2007.

(51) Int. Cl.
*H02G 1/02* (2006.01)
(52) U.S. Cl. .......................... 254/134.3 R; 254/134 CL
(58) Field of Classification Search .......... 254/134.3 R, 254/134, 3 FT, 134.3 CL, 134.3 PA
See application file for complete search history.

(56) References Cited

U.S. PATENT DOCUMENTS

| | | | |
|---|---|---|---|
| 3,110,480 A | | 11/1963 | Eitel |
| 3,170,673 A | * | 2/1965 | McAuley ............ 254/134.3 PA |
| 3,596,878 A | | 8/1971 | Parsen |
| 3,648,976 A | * | 3/1972 | Neale, Sr. ........... 254/134.3 CL |
| 3,672,636 A | | 6/1972 | Parsen |
| 3,861,650 A | | 1/1975 | Jackson |
| 4,014,516 A | | 3/1977 | Jacks |
| 4,386,759 A | | 6/1983 | Gover et al. |
| 4,549,723 A | * | 10/1985 | Castilano ..................... 254/405 |
| 4,690,381 A | * | 9/1987 | Asai ........................... 254/394 |
| 5,040,771 A | | 8/1991 | Spell |
| 5,064,172 A | * | 11/1991 | Hereford ............ 254/134.3 PA |
| 5,524,869 A | | 6/1996 | Asplin |
| 5,533,710 A | * | 7/1996 | Sauber ............... 254/134.3 PA |
| 5,779,229 A | | 7/1998 | Lirette |
| 5,901,651 A | | 5/1999 | Boyd |
| 6,293,520 B1 | | 9/2001 | Turner |
| 6,315,269 B1 | * | 11/2001 | Fleury et al. ........ 254/134.3 PA |
| 6,517,052 B1 | | 2/2003 | Lake |
| 7,374,149 B1 | * | 5/2008 | Dacey ........................ 254/134 |
| 2009/0065750 A1 | * | 3/2009 | Theisen ................ 254/134.3 R |

* cited by examiner

*Primary Examiner*—Lee D Wilson
(74) *Attorney, Agent, or Firm*—Whiteford, Taylor & Preston LLP; Jeffrey C. Maynard (57) ABSTRACT

A non-slip overlash jig for pulling cable along a support line via a towrope such that when the towrope is slack, the overlash jig does not retreat along the support line thereby slacking the cable. The non-slip overlash jig includes a housing having a roller and a clamping mechanism for engaging the cable. The roller is rotatably mounted to the housing and includes a one-way roller bearing that prevents sliding of the non-slip overlash jig when there is slack in the towrope.

12 Claims, 10 Drawing Sheets

NON-SLIP OVERLASH JIG

CROSS REFERENCE TO RELATED APPLICATION

This application is based upon and claims benefit of copending and co-owned U.S. Provisional Patent Application Ser. No. 60/953,646 entitled "Non-Slip Overlash Jig", filed with the U.S. Patent and Trademark Office on Aug. 2, 2007 by the inventor herein, the specification of which is incorporated herein by reference.

BACKGROUND OF THE INVENTION

1. Field of the Invention

The present invention relates generally to an improved overlash jig. More particularly, the invention relates to a device for pulling cable along an existing line such as the lines between utility poles. The invention more specifically relates to a device for pulling cable that remains in place without introducing slack on the cable when the device is no longer under tension.

2. Background

Utility poles support different types of cables that provide services to consumers. These services may include electricity, cable television, telephone, and internet connections, among others. Often, power companies own the poles that support such cables. The owners usually charge other companies who want to utilize the existing poles to support cables for their particular services.

In order to upgrade services to consumers, such as coaxial or fiber optic cables, between utility poles, companies typically lash one or more new cables to existing cables already connected to the utility poles. A new cable is installed between the utility poles using a device that hangs on and rolls along an existing cable. The new cable is secured to one end of the device and a towrope is secured to the other end of the device. The device is then pulled along the existing cable using the towrope. The new cable follows and is then attached to the existing support cable.

These devices, called overlash jigs, are normally utilized to "pull" a new cable "and keep it in line with" an existing cable. In some embodiments, the rope connects the jig to a vehicle/other towing device or other means for pulling it along the path of the existing cable. In some cases, the cable is pulled by a member of a ground crew.

Generally, the towrope remains continuously under tension and the device pulls a new cable into place. Sometimes, the tension on the towrope may be relaxed accidentally or by necessity. For example, when the vehicle or person towing the device stops, when the tow line breaks, or when an obstacle needs to be overcome. Additionally, when a second pole is encountered in the stringing operation, the pulling stops while the jig is disengaged, moved past the pole, and reengaged. In such situations, the jig may travel backwards due to the new cable's own weight. Such backward travel may result in personal injuries or damage to the cables and equipment. While some prior art devices use clamps to prevent backward motion of the device, they are only used in new construction or initial installation of lines wherein the prior art device rides on a support line, which is basically wire rope approximately ¼" in diameter. Often new cable is added to existing cable packages, which consist of two or more coaxial/fiber optic cables that were previously overlashed to the support line. This requires a device that will ride on a larger cable package, other than a support line.

SUMMARY OF THE INVENTION

One embodiment of the present invention provides an improved non-slip overlash jig for installing cable between utility poles. The non-slip overlash jig prevents backward travel of the device when the jig is not being pulled. A preferred embodiment of the invention provides that such an overlash jig include a one-way roller bearing and clamping device that prevents rearward travel of the jig when the towing rope is slackened.

Accordingly, it is an object of the present invention to enable an overlash jig that avoids the disadvantages of the prior art.

Another object of the present invention is to enable a non-slip overlash jig. A related object of the present invention is to enable an overlash jig using one-way roller bearings.

Another object of the present invention is to enable the installation of multiple cables at the same time utilizing an existing cable to support the overlash jig of the present invention. A further object of this invention is to allow the installation of cables upon supporting cable packages of different diameters.

This invention addresses the issue of adding new cable to existing cable/wire packages. The device will ride on existing cable packages while towing one or more coaxial/fiber optic cables. It also has a braking mechanism to stop it from rolling backwards when the towrope is slackened. In a preferred embodiment, the device can clamp to any size cable/fiber optic package up to 2¾ inches in diameter. The invention comprises a three-sided frame with a rubber pulley on one end. The rubber pulley has a one-way roller bearing installed to allow the pulley to roll in only one direction. On the other end is a rubber braking mechanism with the same shape as the pulley. This mechanism is spring loaded to allow the device to clamp to any size cable/fiber optic package.

Other objects and advantages of this invention will become apparent from the following description taken in conjunction with the accompanying drawings wherein are set forth, by way of illustration and example, certain embodiments of this invention. The various features of novelty that characterize the invention will be pointed out with particularity in the claims of this application.

BRIEF DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION

The invention summarized above and defined by the enumerated claims may be better understood by referring to the following description, which should be read in conjunction with the accompanying drawings in which like reference numbers are used for like parts. This description of an embodiment, set out below to enable one to build and use an implementation of the invention, is not intended to limit the invention, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Referring to the drawings, a non-slip overlash jig 100 of the present invention is shown in FIGS. 1-4. The overlash jig 100 has three primary parts. The first part is a housing 101 that includes a front sidewall 102, a rear sidewall 104, a bottom sidewall 107, a left sidewall 120, and a right sidewall 122. One or more linking rings 109 are attached to the rear sidewall 104, and a tow ring 111 is attached to the bottom sidewall 107.

The second part is a connecting arm 117. The connecting arm 117 has four parts: an elongated arm portion 118, a top 124, a hook 126, and a guide 130. A bottom end of the arm 118 connects to the housing 101 and extends generally perpendicularly away from the housing 101. A top end of the arm portion 118 is connected on a distal end to an end 132 of the top 124. The top 124 extends generally perpendicularly away from the arm portion 118 towards the inside of the overlash jig 100. A second end 133 of the top 124 connects to the hook 126. The hook 126 extends generally perpendicularly downwards from the top 124 towards the housing 101. The hook 126 is connected to at least one roller 128 and a guide 130. The at least one roller 128 is mounted on an axle 129 by a one-way roller bearing 137 that allows the at least one roller 128 to rotate in only one direction. One end of the axle 129 is attached to the hook 126; the other end is attached to the arm portion 118, such that the axle 129 is substantially parallel to the top 124. The guide 130 keeps the overlash jig 100 in line with and prevents the overlash jig 100 from riding up over the existing cable. The roller 128 is sized and configured to rollingly engage a pre-existing support cable.

Figure 1:
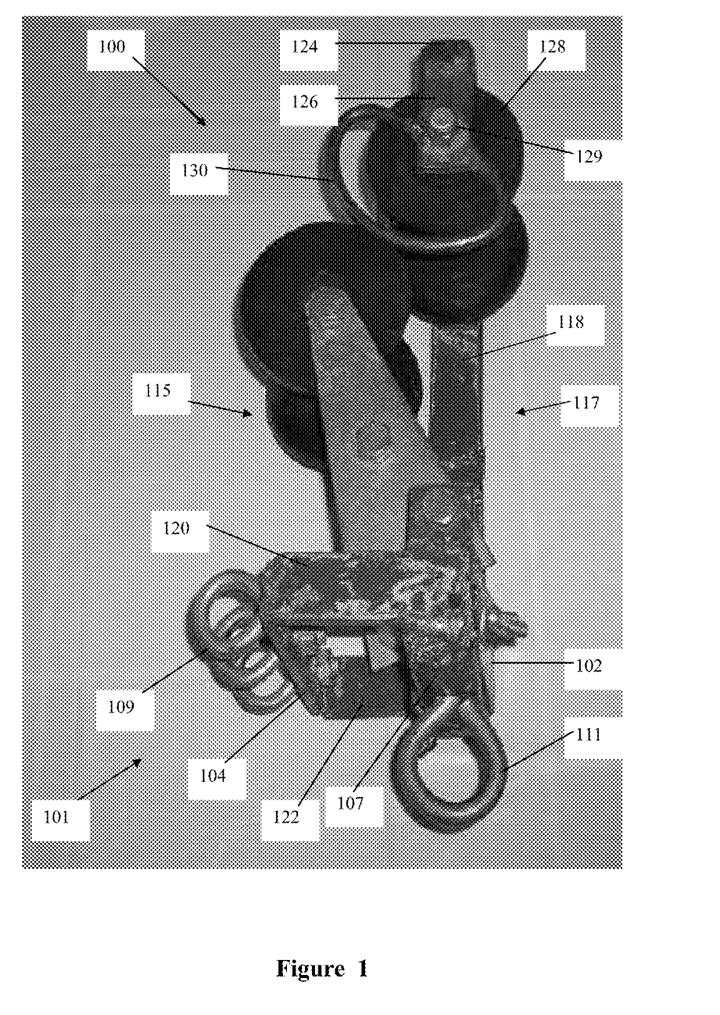
FIG. 1 is a left perspective view of a non-slip overlash jig with a closed clamping mechanism.
Figure 2:
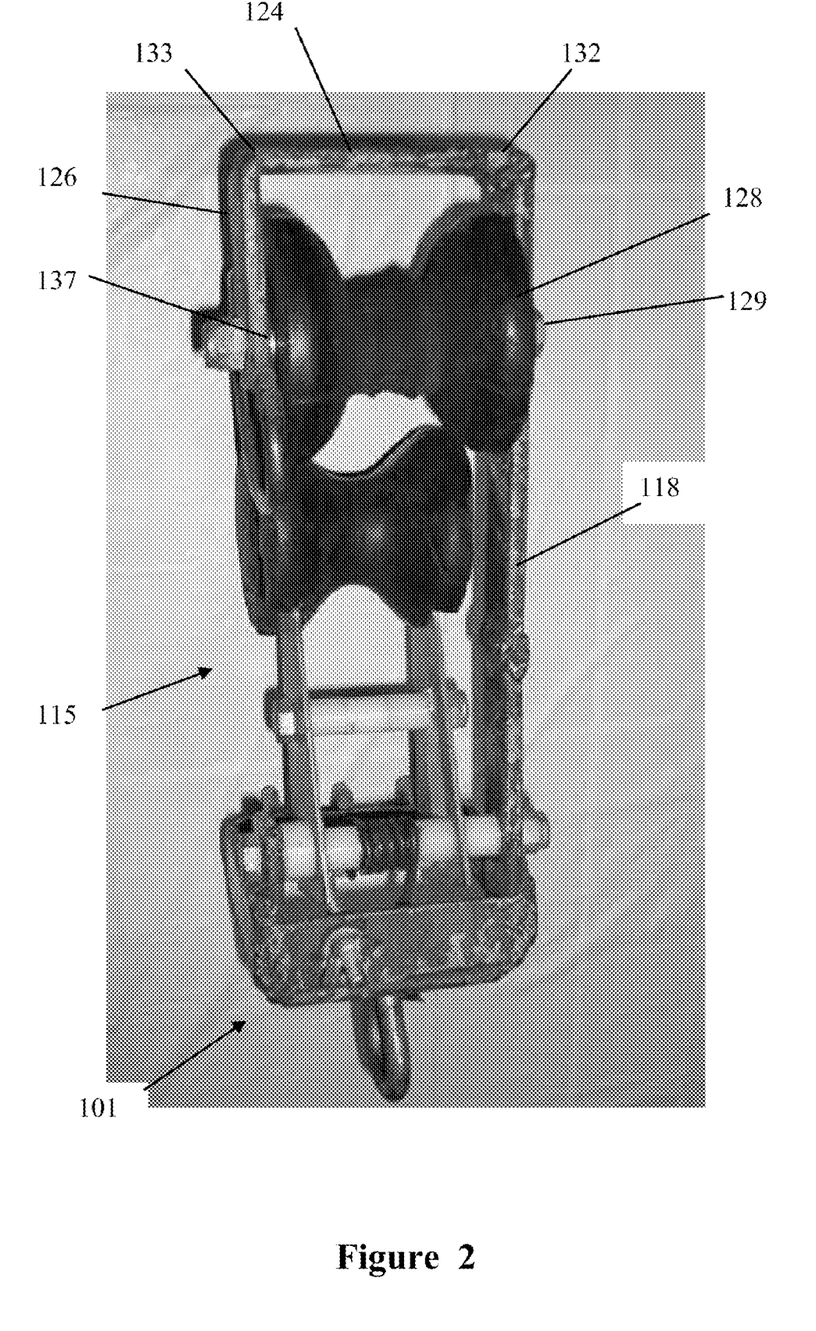
FIG. 2 is a front view of a non-slip overlash jig.
Figure 3:
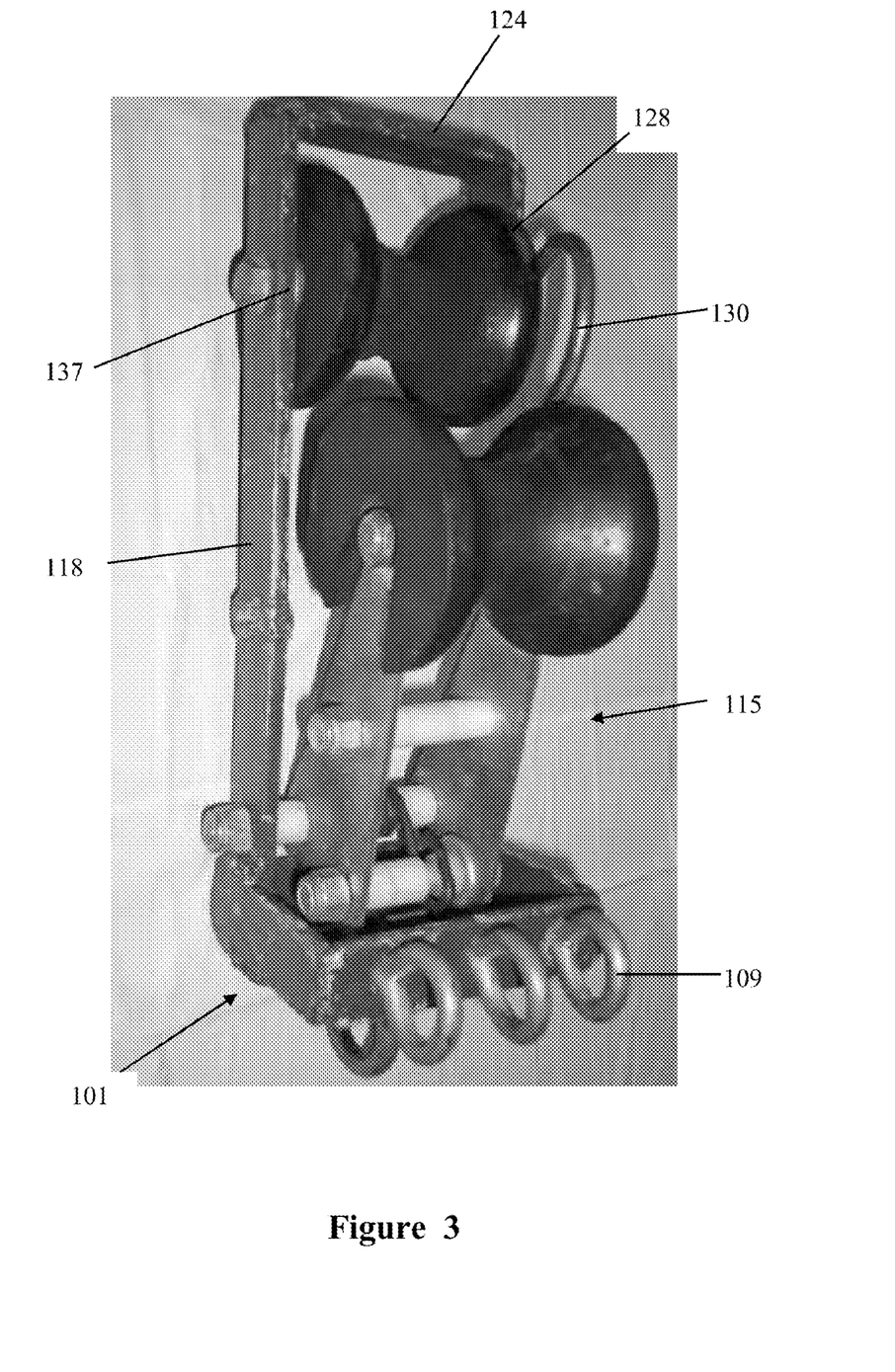
FIG. 3 is a rear view of a non-slip overlash jig.
Figure 4:
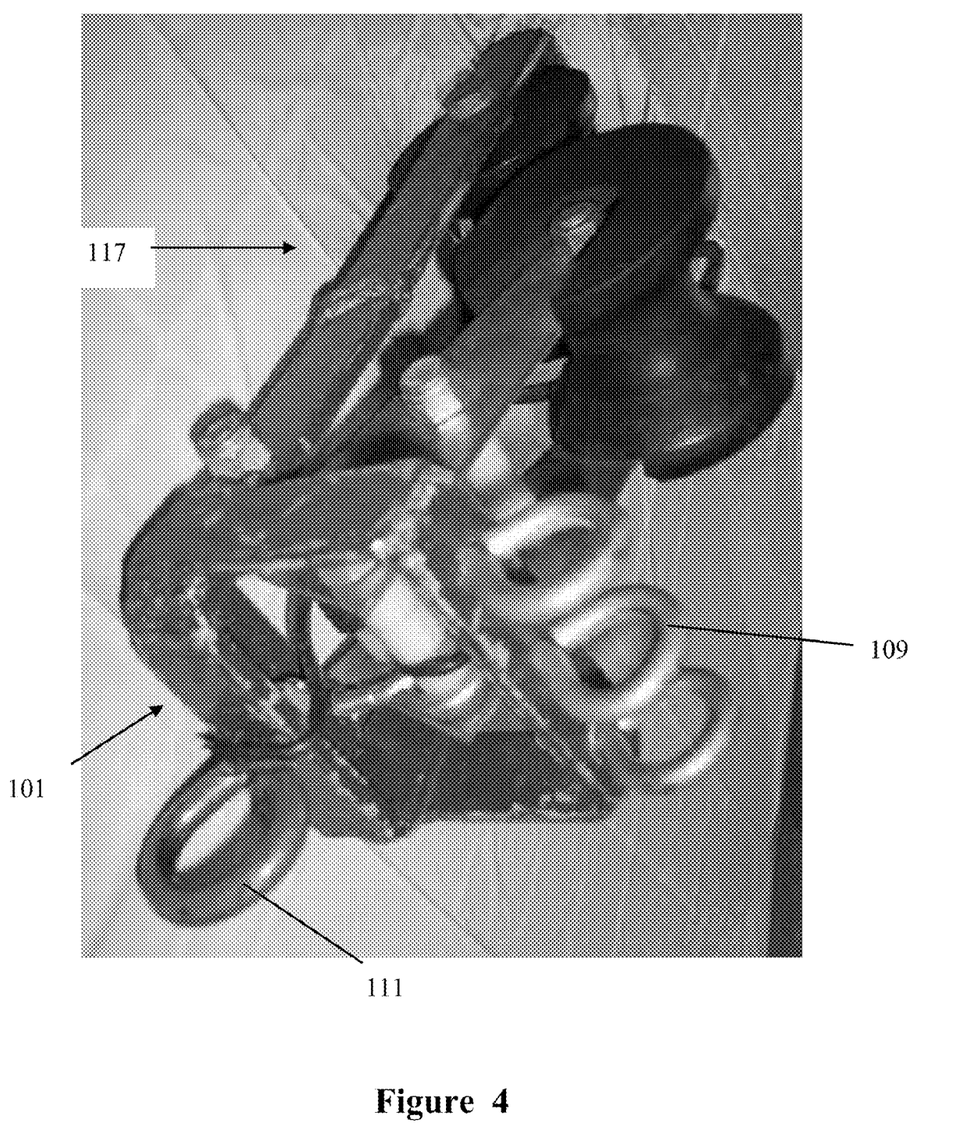
FIG. 4 is a bottom perspective view of a non-slip overlash jig.
Figure 5:
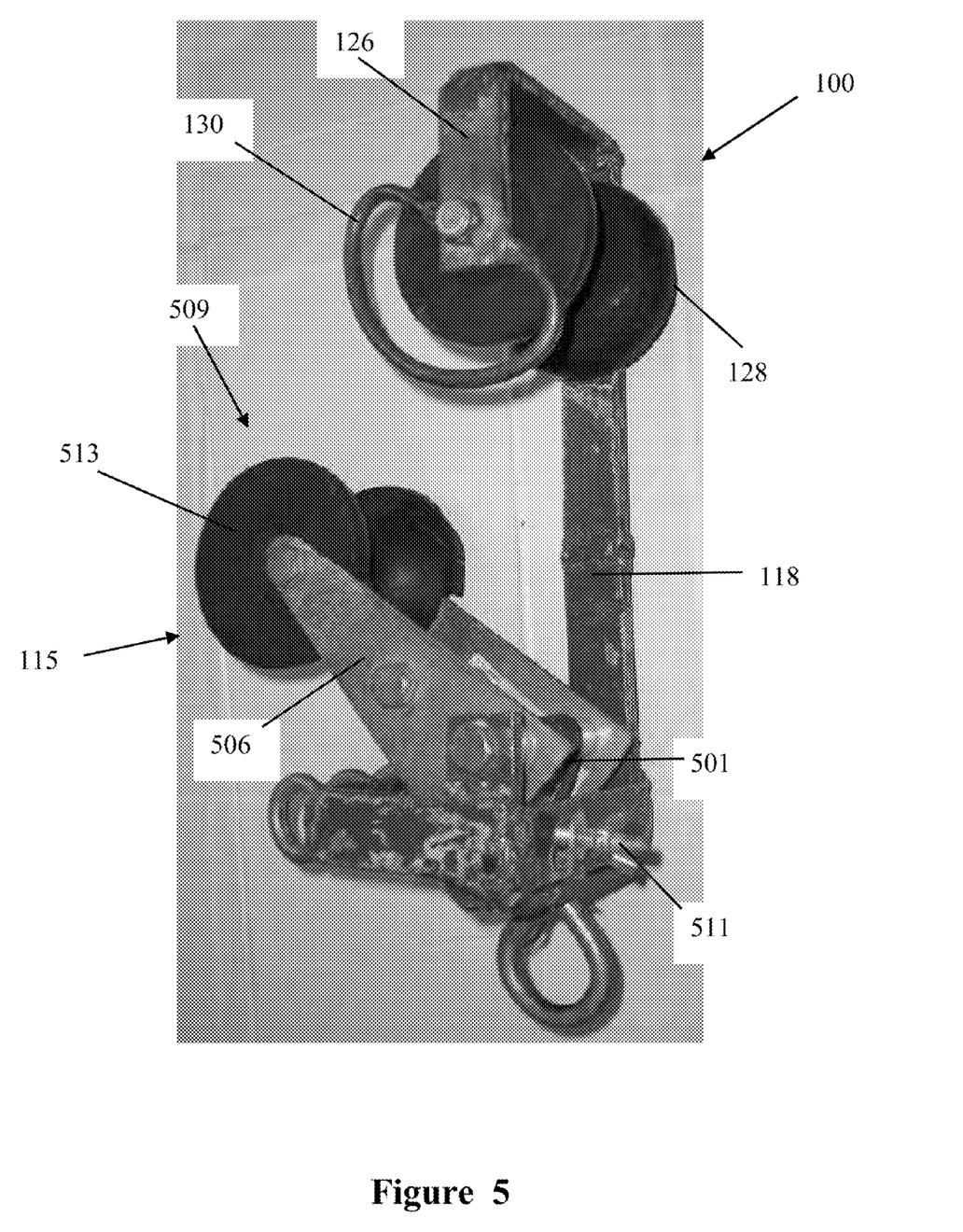
FIG. 5 is a left perspective view of a non-slip overlash jig with an open clamping mechanism.
Figure 6:
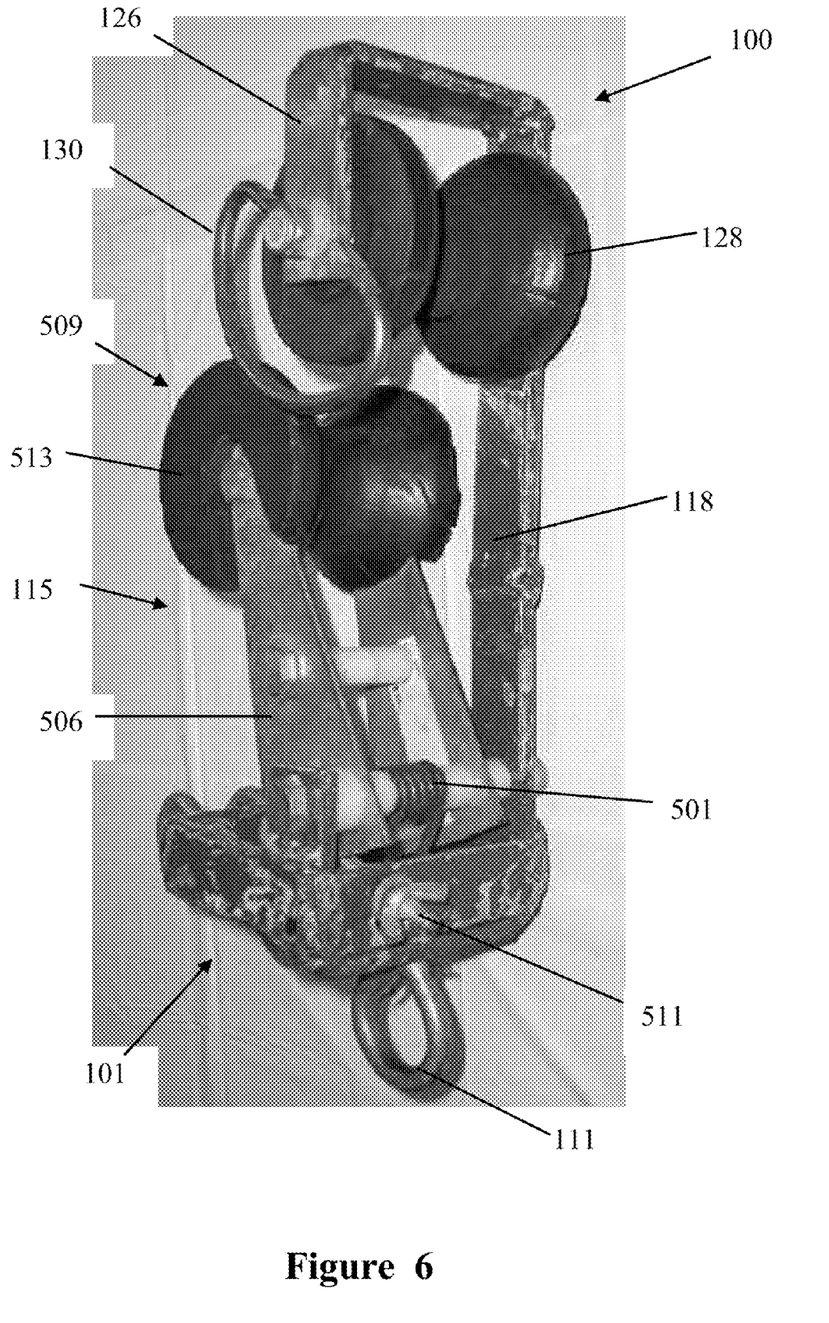
FIG. 6 is a left perspective view of a non-slip overlash jig with a closed clamping mechanism
Figure 7:
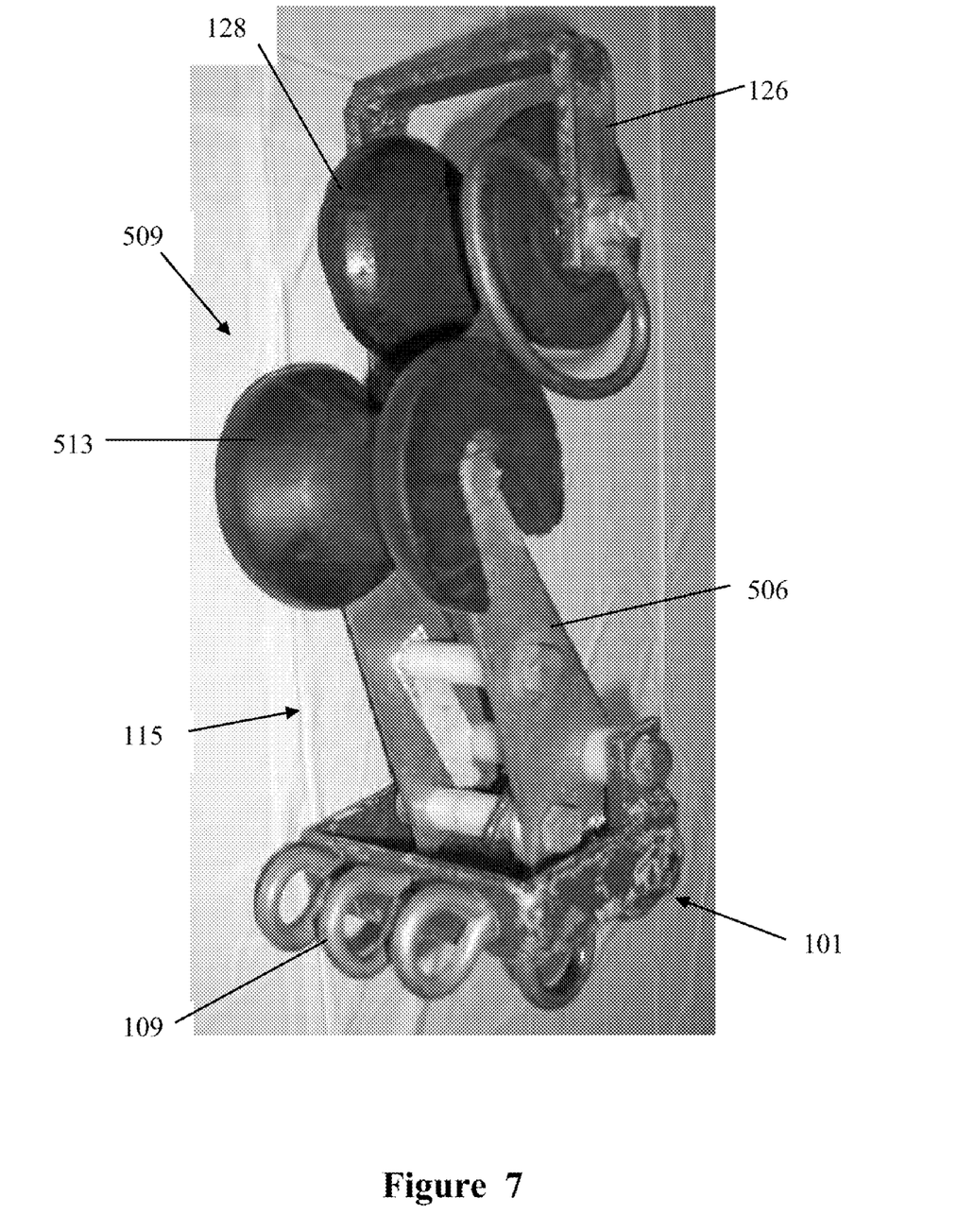
FIG. 7 is a rear perspective of a non-slip overlash jig with a closed clamping mechanism.
Figure 8:
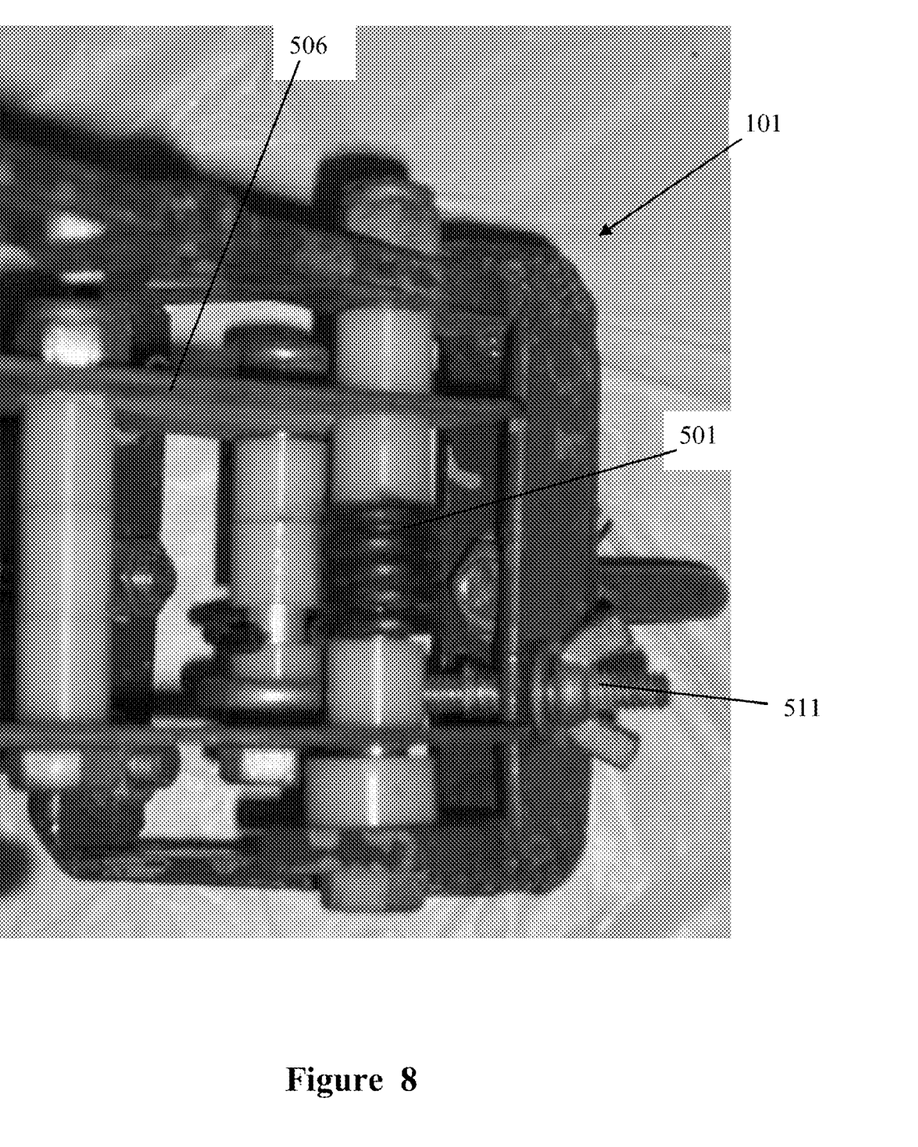
FIG. 8 is a front perspective of the clamping mechanism.

The third part of the overlash jig 100 is a clamping mechanism 115 that allows the non-slip overlash jig 100 to clamp to any size cable or fiber optic package. As shown in FIGS. 5 and 6, the clamping mechanism 115 includes a spring mechanism 501, a lever arm 506, a static end 509 having at least one bumper 513 (best seen in FIG. 7), and an adjusting nut 511. In one embodiment of the present invention, the at least one bumper 513 has the same shape as the roller 128. Both the roller 128 and the bumper 513 have a concave structure allowing them to cradle an existing cable package. The at least one bumper 513 is sized and configured to engage the pre-existing support cable although the bumper 513 does not rotate on the lever arm 506. As shown in FIG. 8, the lever arm 506 is pivotally attached to the housing 101. The spring mechanism 501 provides a biasing force tending to urge the lever arm 506 toward parallel alignment with the connecting arm 117. In a preferred embodiment, the overlash jig 100 can be used on cable packages up to 2¾ inches in diameter. With an appropriately sized roller 128 and bumper 513, other sized cable packages can be accommodated. The roller 128 engages the top of the support cable and the clamping mechanism 115 keeps the overlash jig 100 in place while it is being pulled. The clamping mechanism 115 also assists in braking the overlash jig 100 when tension is removed from the towrope. The one-way bearing 137 of roller 128 is installed such that movement of the overlash jig 100 along a pre-existing cable is in a direction away from the clamping mechanism 115. The one-way bearing 137 of roller 128 prevents backward motion of the overlash jig 100, and the bumper 513 of the clamping mechanism 115 provides additional resistance to movement of the jig 100. The adjusting nut 511 adjusts the length of travel of the lever arm 506 to accommodate various size cable packages.

It is understood that an existing cable upon which the non-slip overlash jig 100 travels may vary in size. In some cases, this change in size is due to previous installations of other cables. The previous installations result in an existing cable with multiple lines lashed to the underlying cable and with an increased diameter. In one preferred embodiment, the invention may be utilized on cable packages up to 2¾ inches in diameter. Other sizes may also be accommodated.

It is contemplated that the roller 128 and the bumper 513 of the clamping mechanism 115 may be constructed of a number of materials such as elastic, rubber, metal, and other materials whose structure prevents the overlash jig from sliding when the one-way bearing 137 for roller 128 locks.

Figure 9:
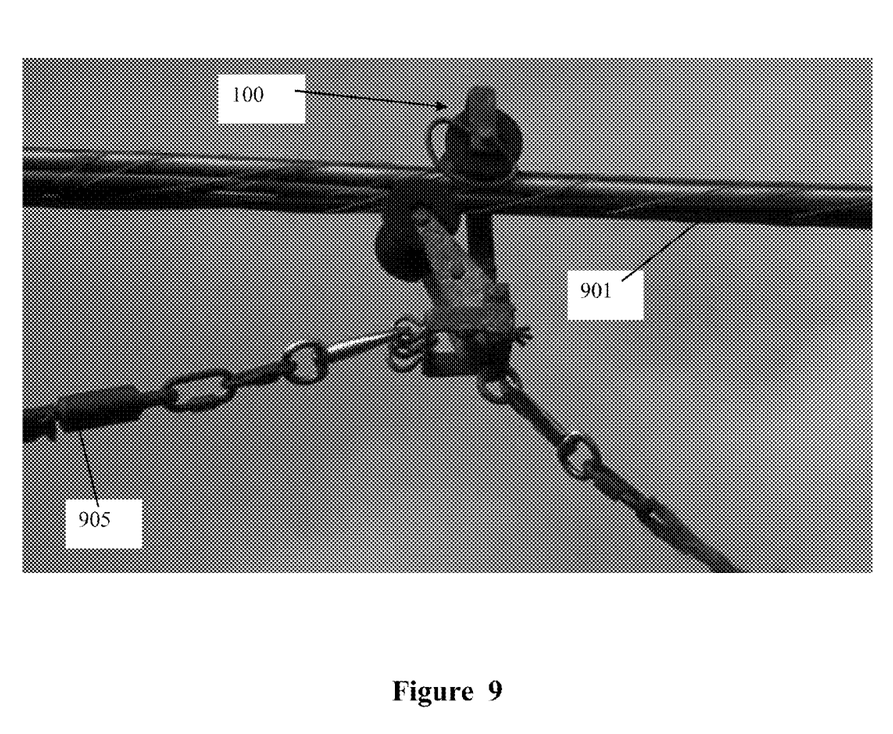
FIG. 9 is a close elevational view of a non-slip overlash jig being pulled by a rope and towing a cable.
Figure 10:
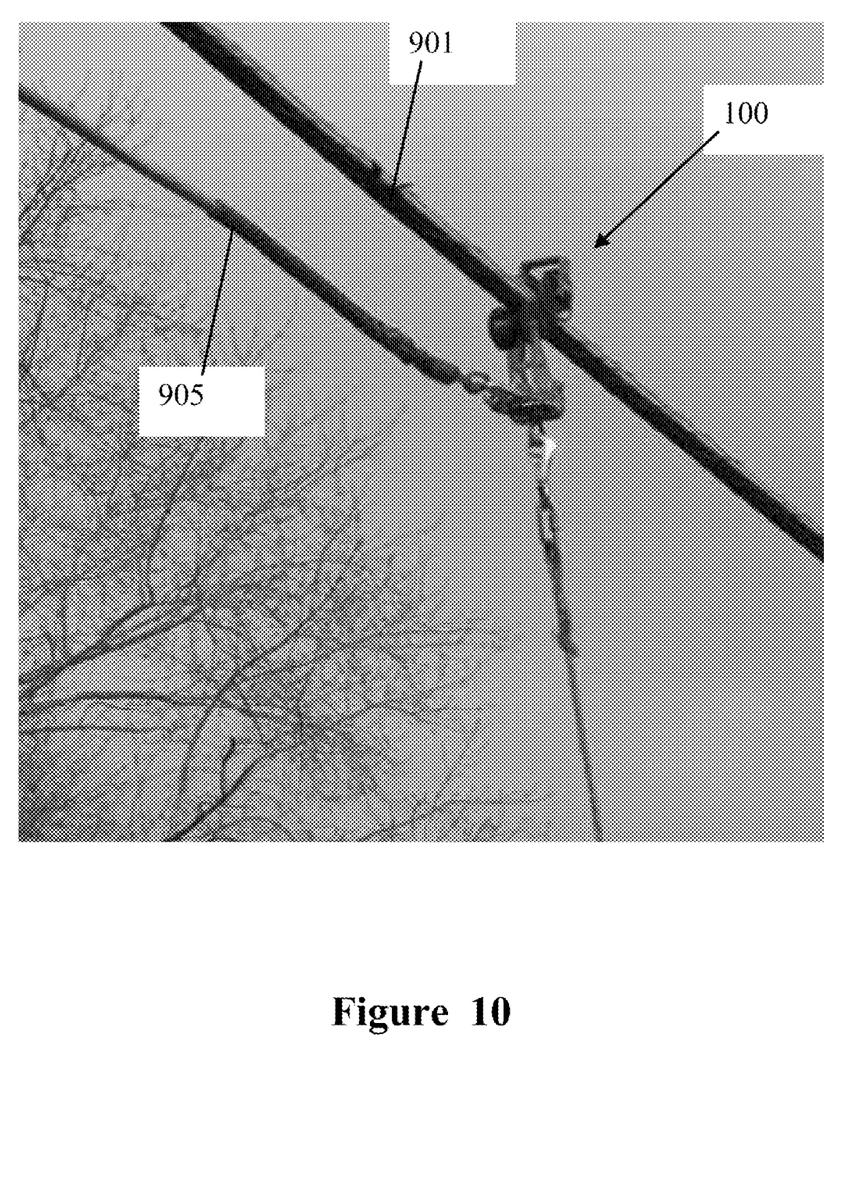
FIG. 10 is an elevational view of a non-slip overlash jig being pulled by a rope and towing a cable.

As shown in FIG. 9, in one preferred embodiment of the present invention, the non-slip overlash jig 100 of the present invention is utilized to rollingly engage and travel along an existing cable 901 connected between two supporting structures to carry a new line 905 from one supporting structure to the next. The existing cable 901 may correspond to service lines, such as telephone, cable, internet access, fiber optics, and others that provide a service to an end user. The supporting structures may include utility poles, buildings, or other structures connected by the existing cable 901. The existing cable 901 generally extends horizontally from a first support point on one structure to a second support point on a second structure. The non-slip overlash jig 100 is utilized to install a line 905 of cable from the first supporting structure to a second supporting structure. It is contemplated that the new line 905 may utilize the same support points that the existing cable 901 utilizes, or new support points on each supporting structure.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It should be understood, therefore, that the invention may be practiced otherwise than as specifically set forth herein. Consequently, the present embodiments are to be considered in all respects as illustrative and not restrictive.

What is claimed is:

1. An overlash jig adapted to rollingly engage a preexisting support line for pulling a new cable along said support line, said overlash jig comprising:
   a housing member;
   a connecting arm extending from said housing with a hook extending perpendicular from said top having a guide member which extends beyond said hook in a perpendicular and parallel directions;
   at least one roller member rotatably mounted to said connecting arm, wherein said roller member is mounted on a one-way roller bearing that allows said roller member to rotate in only one direction; and
   a clamping mechanism attached to said housing.

2. The overlash jig of claim 1 wherein said at least one roller member is adapted to rollingly engage an upper surface of said pre-existing support line.

3. The overlash jig of claim 1, said housing further comprising a tow ring attached to said housing.

4. The overlash jig of claim 1, said housing further comprising at least one linking ring attached to said housing.

5. The overlash jig of claim 1, said connecting arm further comprising:
   an elongate arm; and
   a top extending perpendicular from a distal end of said elongate arm.

6. The overlash jig of claim 5 wherein said at least one roller member is mounted on an axle connected on one end to said hook and on another end to said elongate arm.

7. The overlash jig of claim 5, further comprising a guide member attached to said hook wherein said guide member is an elongated substantially oval shaped ring.

8. The overlash jig of claim 1, said clamping mechanism further comprising:
   a lever arm pivotally attached to said housing;
   at least one bumper mounted to a distal end of said lever arm; and
   a spring mechanism operationally attached between said lever arm and said housing.

9. The overlash jig of claim 8 wherein said spring mechanism provides a biasing force tending to urge the lever arm toward parallel alignment with the connecting arm.

10. The overlash jig of claim 8, further comprising an adjusting means to adjust the length of travel of the lever arm.

11. The overlash jig of claim 8, further comprising an adjusting means to adjust the length of travel of the lever arm wherein said means further comprises an elongated bolt with a connecting bolt fastener.

12. The overlash jig of claim 1, said housing further comprising at least three linking ring attached to said housing.

* * * * *